(12) United States Patent  (10) Patent No.: US 8,037,069 B2
Chakrabarti et al.  (45) Date of Patent: Oct. 11, 2011

(54) MEMBERSHIP CHECKING OF DIGITAL TEXT

(75) Inventors: Kaushik Chakrabarti, Redmond, WA (US); Surajt Chaudhuri, Redmond, WA (US); Venkatesh Ganti, Redmond, WA (US); Dong Xin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 571 days.

(21) Appl. No.: 12/132,108

(22) Filed: Jun. 3, 2008

(65) Prior Publication Data

US 2009/0300014 A1  Dec. 3, 2009

(51) Int. Cl.
*G06F 7/00* (2006.01)
*G06F 17/30* (2006.01)

(52) U.S. Cl. ......... 707/736; 707/739; 707/754; 707/758

(58) Field of Classification Search ..................... None
See application file for complete search history.

(56) References Cited

U.S. PATENT DOCUMENTS

| | | | |
|---|---|---|---|
| 6,029,167 A | 2/2000 | Evans | |
| 6,249,784 B1 | 6/2001 | Macke et al. | |
| 6,523,026 B1* | 2/2003 | Gillis | 1/1 |
| 6,778,970 B2 | 8/2004 | Au | |
| 7,010,522 B1 | 3/2006 | Jagadish et al. | |
| 7,181,768 B1 | 2/2007 | Ghosh et al. | |
| 7,346,490 B2 | 3/2008 | Fass et al. | |
| 7,444,326 B1* | 10/2008 | Jagadish et al. | 1/1 |
| 7,814,107 B1* | 10/2010 | Thirumalai et al. | 707/749 |
| 2004/0260543 A1 | 12/2004 | Horowitz et al. | |
| 2007/0185910 A1 | 8/2007 | Koike et al. | |
| 2008/0016019 A1 | 1/2008 | Loftus et al. | |
| 2008/0040345 A1 | 2/2008 | Cameron | |
| 2008/0183693 A1* | 7/2008 | Arasu et al. | 707/5 |

OTHER PUBLICATIONS

Frieder, et al., "On the Integration of Structured Data and Text: A Review of the SIRE Architecture", In DELOS Workshop on Information Seeking, Searching, and Querying in Digital Libraries Dec. 2000, pp. 1-6.
Gravano, et al., "Using q-Grams in a DBMS for Approximate String Processing", 2001, pp. 1-7.
Pevzner, et al., "A Fast Filtration Algorithm for the Substring Matching Problem", Proceedings of the 4th Annual Symposium on Combinatorial Pattern Matching, 1993, pp. 1-10.
Aho, et al., "Efficient String Matching: An Aid to Bibliographic Search", Jun. 1975, vol. 18, Issued: 6, ACM Press, New York, USA, pp. 333-340.
Amir, et al., "Text Indexing and Dictionary Matching with One Error", Journal of Algorithms, Sep. 27, 1998, pp. 309-325.
Arasu, et al., "Efficient Exact Set-Similarity Joins", Proceedings of the 32nd international conference on Very large data bases, Sep. 12-15, 2006, pp. 918-929.
Bloom H. Burton, "Space/Time Trade-offs in Hash Coding with Allowable Errors", Jul. 1970, vol. 13, Issued 7, ACM Press New York, NY, USA, pp. 422-426.
Chakrabarti, et al., "Ranking Objects by Exploiting Relationships", Proceedings of the 2006 ACM SIGMOD international conference on Management of data, Jun. 27-29, 2006, ACM Press New York, NY, USA, pp. 371-382.
Chandel, et al., "Efficient Batch Top-k Search for Dictionary-Based Entity Recognition", Proceedings of the 22nd International Conference on Data Engineering, Date 2006, pp. 1-10.

(Continued)

*Primary Examiner* — Jay Morrison

(57) ABSTRACT

The described implementations relate to data analysis, such as membership checking. One technique identifies candidate matches between document sub-strings and database members utilizing signatures. The technique further verifies that the candidate matches are true matches.

20 Claims, 6 Drawing Sheets

OTHER PUBLICATIONS

Cohen, et al., "Finding Interesting Associations without Support Pruning", Jun. 16, 1999, 20 Pages.

Fagin, et al., "Optimal Aggregation Algorithms for Middleware", Journal of Computer and System Sciences 66, Sep. 6, 2001, pp. 614-656.

Gionis, et al., "Similarity Search in High Dimensions via Hashing", Proceedings of the -25th VLDB Conference4, Stanford University, 1999, pp. 518-529.

Gravano, et al., "Approximate String Joins in a Database (Almost) for Free", Proceedings of the 27th VLDB Conferenc, 2001, pp. 491-500.

Haveliwala, et al., "Scalable Techniques for Clustering the Web", Jun. 2000, vol. 14, Issue 3, pp. 1-6.

Manber, et al., "An Algorithm for Approximate Membership Checking with Application to Password Security", Appeared in Information Processing Letters, 1994, vol. 50, pp. 1-10.

Narayanan, et al., "Gapped Local Similarity Search with Provable Guarantees", Algorithms in Bioinformatics, Oct. 29, 2004, vol. 3240/2004, Springer Berlin, pp. 74-86.

Ramaswamy, et al., "Approximate Fingerprinting to Accelerate Pattern Matching", Algorithms in Bioinformatics, Oct. 29, 2004, vol. 3240/2004, Springer Berlin, pp. 301-306.

Sarawagi, et al., "Efficient Set Joins on Similarity Predicates", International Conference on Management of Data, Proceedings of the 2004 ACM SIGMOD international conference on Management of data, 2004, ACM Press, New York USA, pp. 743-754.

Singhal Amit, "Modem Information Retrieval: A Brief Overview" IEEE, 2001, pp. 1-9.

Zhou, et al., "MaxMatcher Biological Concept Extraction using Approximate Dictionary Lookup", PRICAI 2006: Trends in Artificial Intelligence, Jul. 26, 2006, vol. 4099/2006, Springer Berlin, pp. 1145-1149.

* cited by examiner

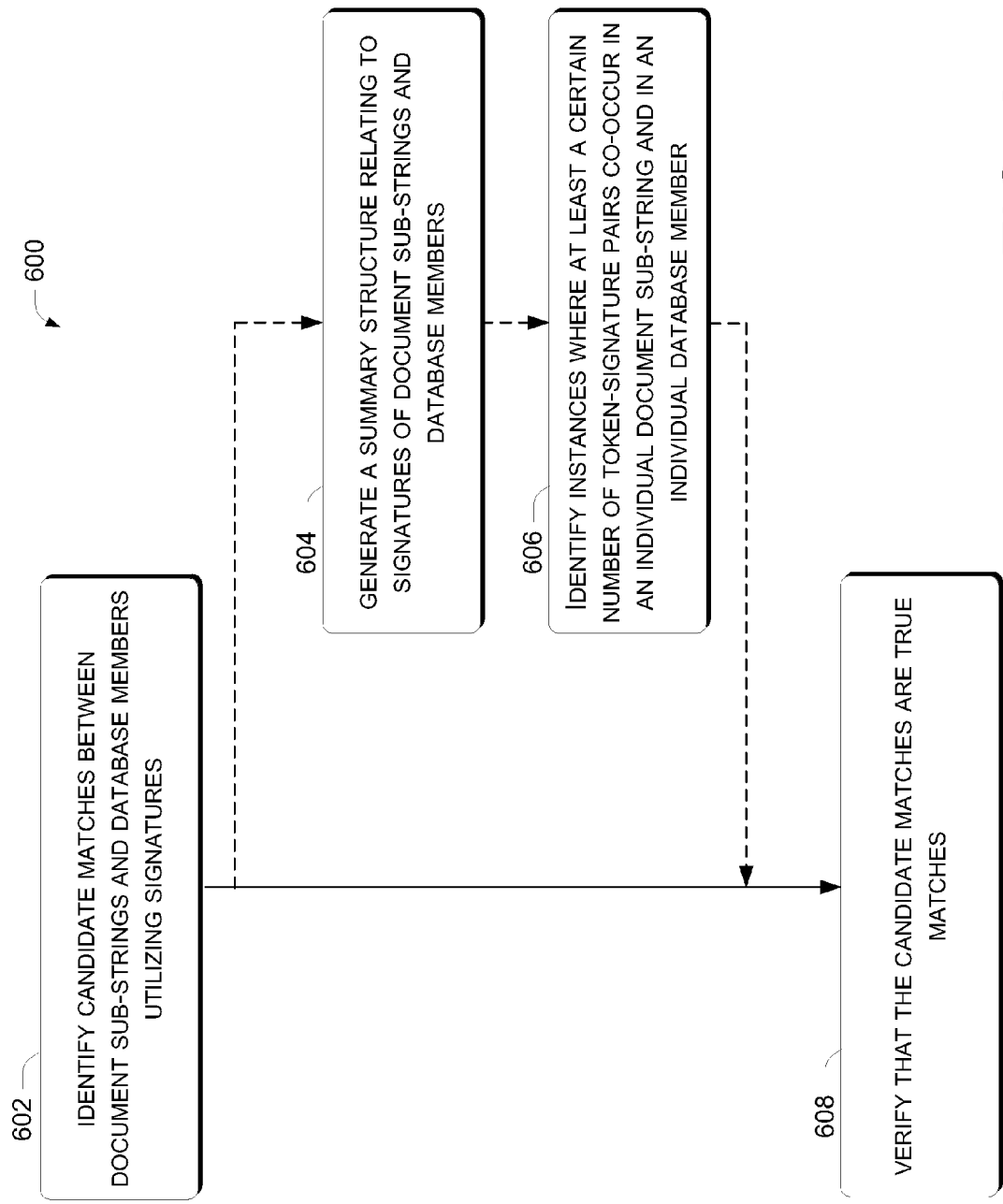

MEMBERSHIP CHECKING OF DIGITAL TEXT

BACKGROUND

The present application relates to data analysis such as detecting the subject matter of digital text. Stated another way, given a particular member such as a person, place, product, scientific concept, etc., does the digital text relate to the member? Often in this type of data analysis text from two sources can be compared. For instance, does text from a document relate to text from a product listing or member of a dictionary? This type of data analysis tends to be resource intensive. For example, the techniques may be utilized to compare thousands of documents that each contains thousands of words to multiple databases that contain millions of entries. Further, user satisfaction may be dependent upon accuracy of the membership checking regardless of the resource issue.

SUMMARY

The described implementations relate to data analysis such as membership checking. One technique identifies candidate matches between document sub-strings and database members utilizing signatures. The technique further verifies that the candidate matches are true matches.

Another implementation is directed to generating a summary structure relating to document sub-string signatures and database members. The implementation further identifies instances where at least a certain number of token-signature pairs co-occur in an individual sub-string and in an individual database member. The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

FIG. 6 is flow diagram of an exemplary method relating to membership checking in accordance with some implementations of the present concepts.

DETAILED DESCRIPTION

Overview

This patent application pertains to data analysis. For instance, the described techniques can be utilized to determine whether text, such as a text document, relates to, refers to, or mentions a member. A member can be thought of as a person, product, location, scientific concept, etc. In some cases, the techniques can be utilized to determine whether a document relates to a member contained in a database. For example, many comparison shopping sites (e.g., MSN shopping) have databases of members such as products or entities. Database product members tend to be relatively complete relative to the manufacturer's given product name such as an entry for "canon EOS digital rebel xti digital SLR camera". In contrast, a web page/review may not use the complete product name. Instead, phrases such as "canon rebel xti digital SLR Camera" are commonly seen on web pages. The present implementations can identify whether a document, such as a product review, relates to a product contained in the database. The document can be considered to relate to a database product where the document contains an exact or approximate match to the database product.

At least some of the implementations use a combination of filtration and verification to identify whether a document relates to an entity. For instance, the document can be broken down into a set of sub-strings. Filtration can determine which sub-strings cannot match an entity. A remainder of the set of sub-strings can be identified as "candidate matches" or "candidate members". Verification can be performed on the candidate matches to further determine which of the candidate matches are "true matches" to a member of the dictionary. Accordingly, substantial processing savings can be obtained in that verification can be reserved for the identified candidate matches. Stated another way, those sub-strings that cannot match a member can be filtered or pruned prior to verification processing. Verification processing resources can then be reserved for the candidate matches.

Exemplary Membership Checking

Figure 1:
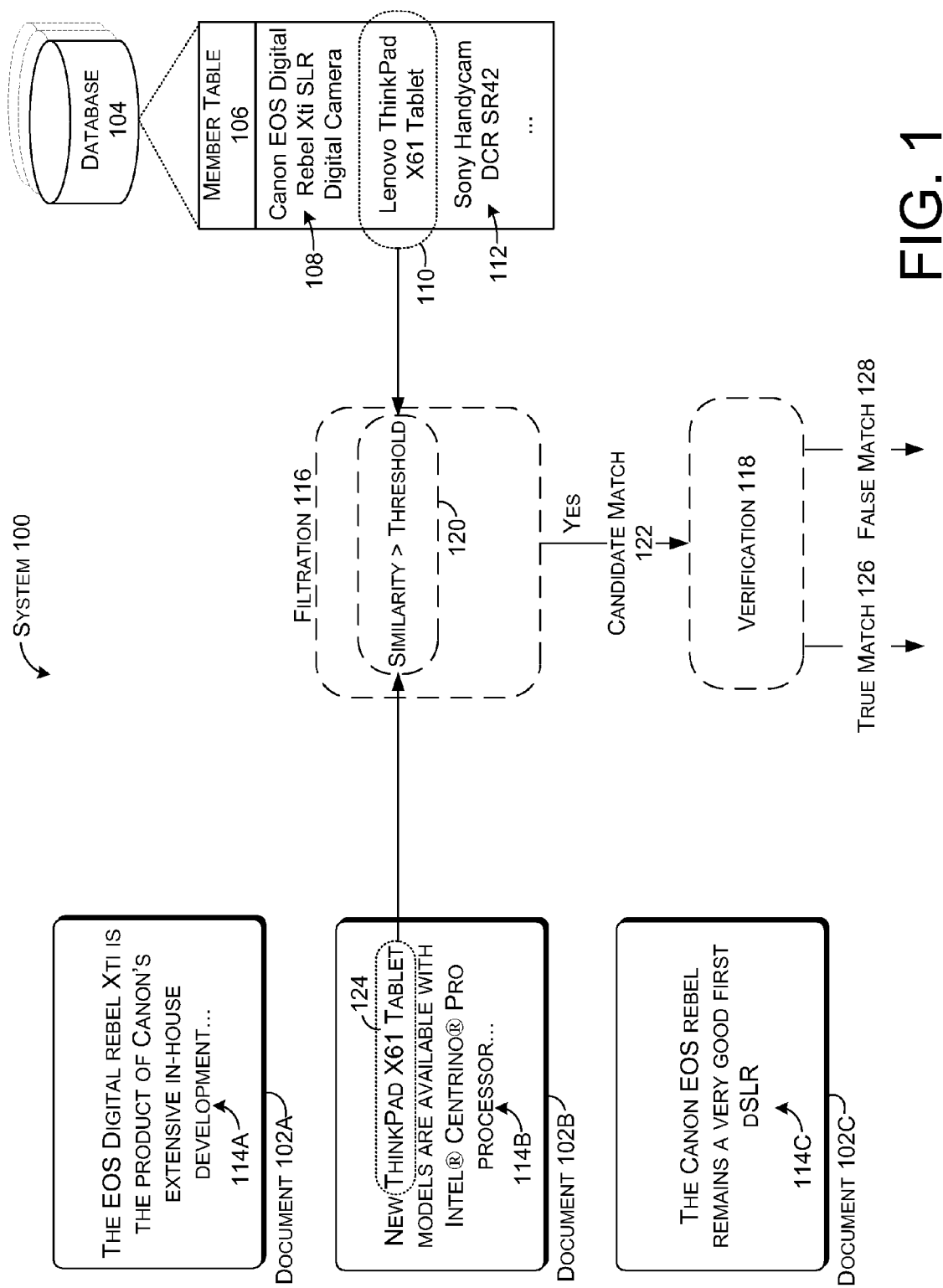
FIGS. 1-3 illustrate exemplary membership checking systems in accordance with some implementations of the present concepts.
Figure 2:
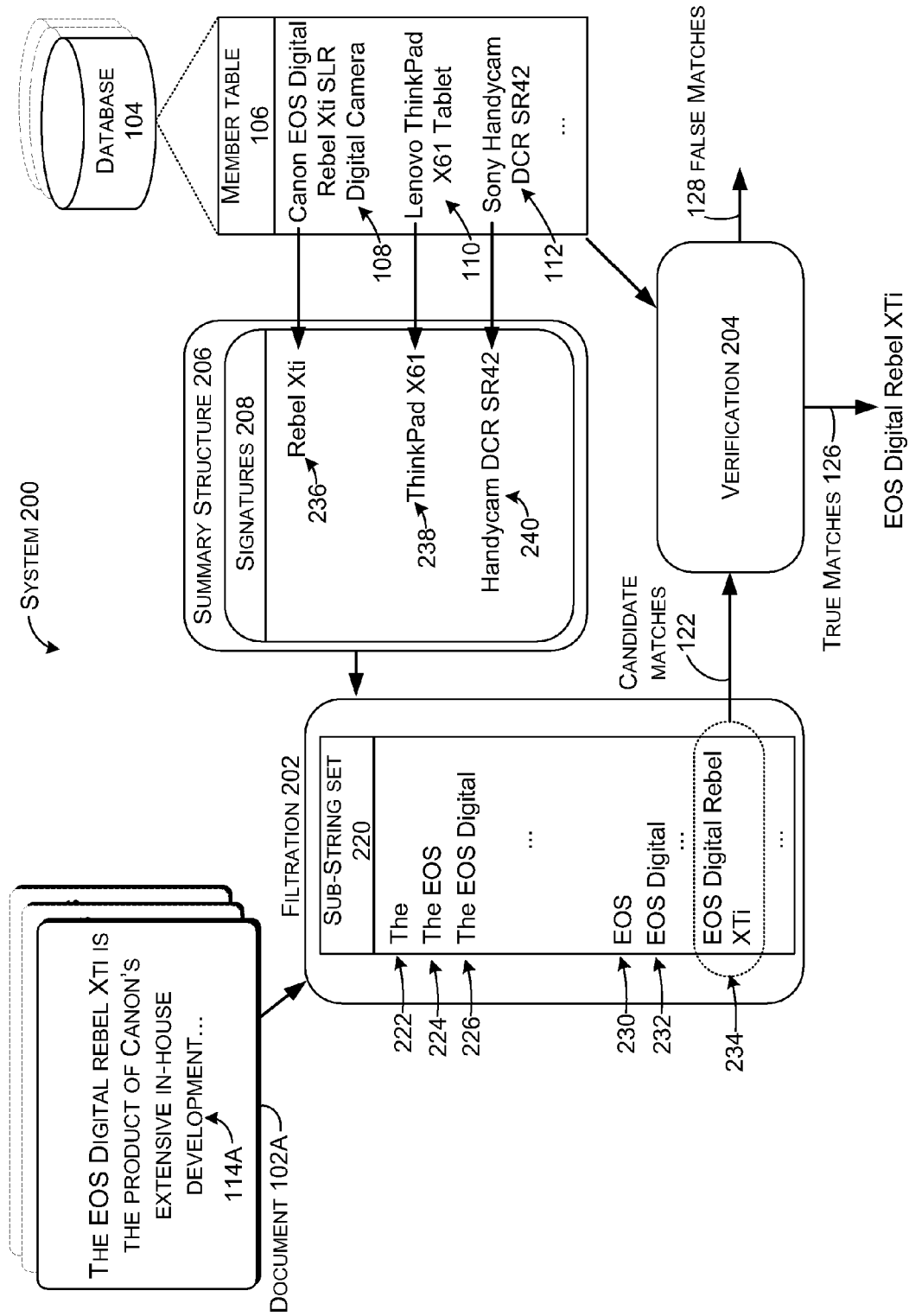
Figure 3:
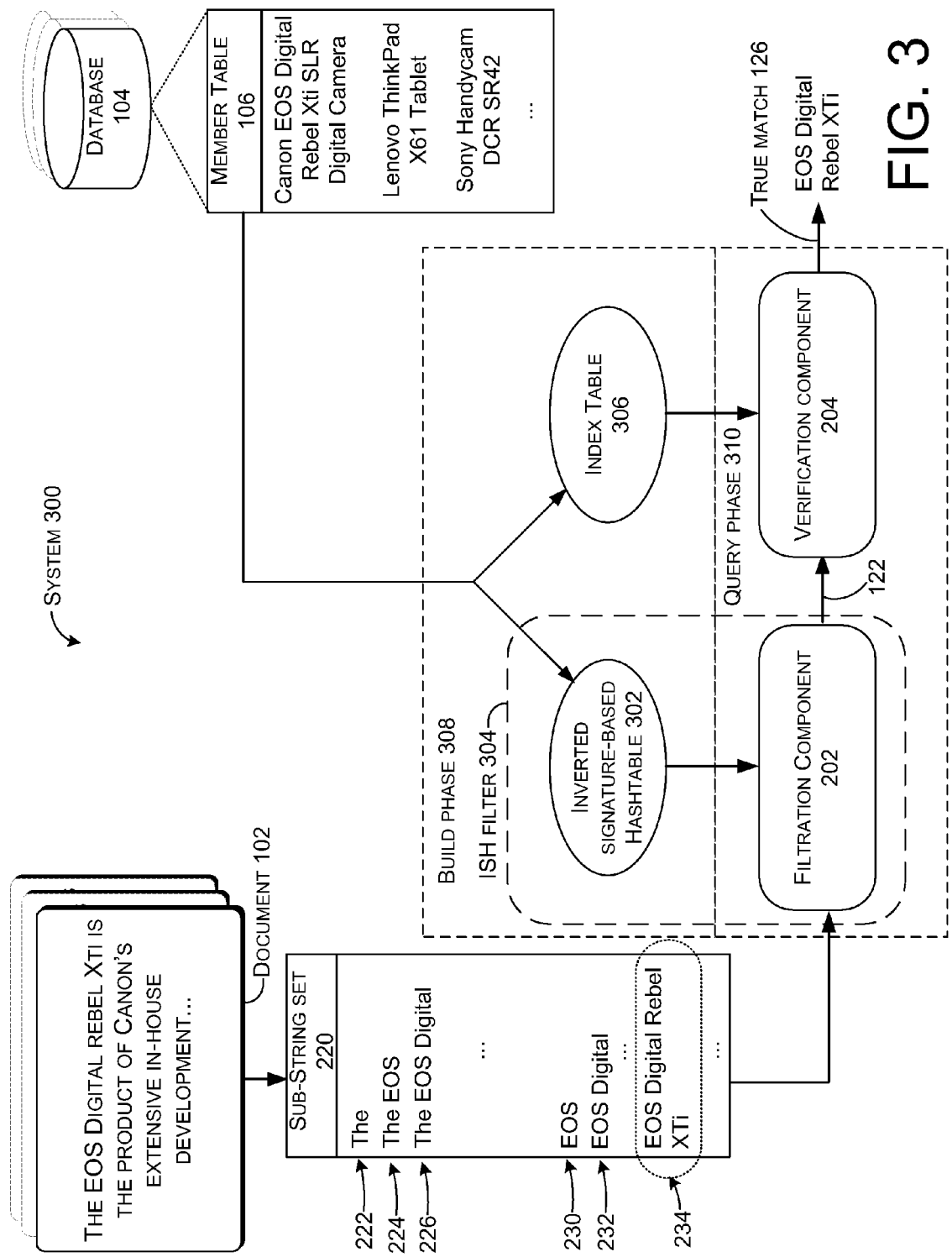
Figure 4:
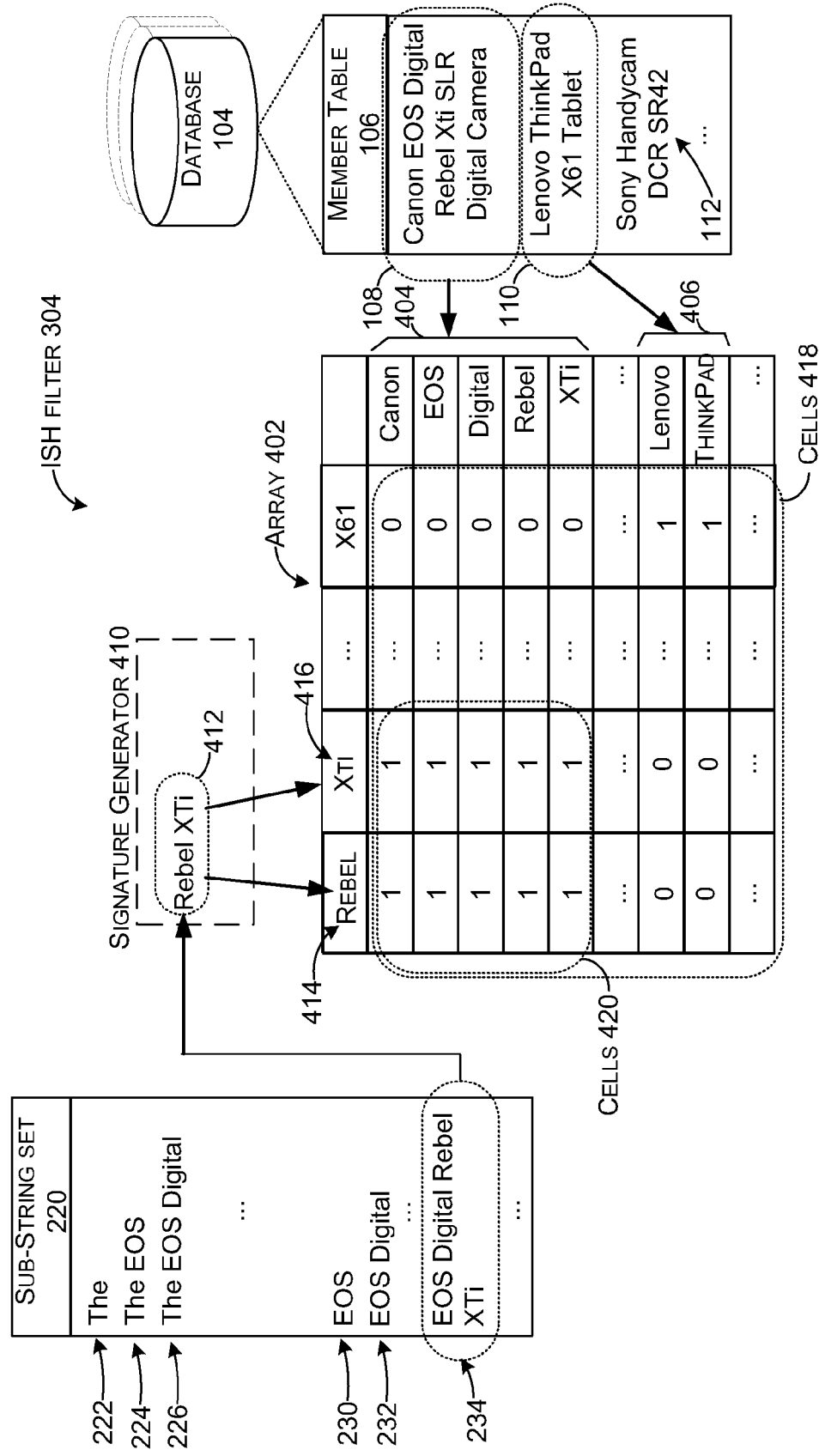
FIG. 4 shows selected elements of the system of FIG. 3 in accordance with some implementations of the present concepts.

FIGS. 1-3 show exemplary systems for membership checking. FIG. 4 shows some of the elements of FIG. 3 in more detail. Several elements introduced in individual FIGURES appear in later FIGURES and as such are not subsequently reintroduced.

FIG. 1 involves a system 100 for membership checking. System 100 includes document(s) 102A, 102B, and 102C and a database(s) 104. In this case, database 104 contains a list of members on a member table 106. Here, member table 106 includes three members: "Canon EOS Digital Rebel Xti SLR Digital Camera" designated at 108, a "Lenovo ThinkPad X61 Tablet" designated at 110, and a "Sony Handycam DCR SR42" designated at 112. In the illustrated example, members 108-112 can be thought of as products.

Documents 102A-102C contain digital text. For instance, a string 114A of document 102A reads "The EOS Digital rebel Xti is the product of Canon's extensive in-house development . . . ". A string 114B of document 102B reads "New ThinkPad X61 Tablet models are available with Intel® Centrino® Pro processor . . . ". A string 114C of document 102C reads "The Canon EOS rebel remains a very good first dSLR". A string can be defined as text manifested as a sequence of tokens. Often tokens are words, but tokens can encompass text that is not a word. For instance a product number can be a token. A string can include all of the text in a document or a portion of the text in a document.

As can be evidenced generally from FIG. 1, people have many different ways to refer to a product and the descriptions they use are often different from the database version. System 100 functions to check whether individual strings 114A-114C or sub-strings thereof approximately or exactly match member entries in database 104. Viewed another way, system 100 can check whether an individual document relates to an individual member (i.e., membership checking). In this instance, for discussion purposes, assume that documents 102A-102C are product reviews. So, in this example, a match can mean that a product review is about, or relates to, one of the members (i.e., products) of member table 106.

In this implementation, system 100 utilizes both a filtration technique 116 and a verification technique 118 to accomplish the membership checking. Filtration technique 116 can compare individual strings 114A-114C and/or sub-strings of a string to the members of member table 106 utilizing a similarity function 120 that employs a similarity threshold. Similarity functions are described in more detail under the heading "Additional Implementations".

In an instance where a degree of similarity between a string/sub-string and a member exceeds a predetermined threshold then the string/sub-string is considered a candidate match 122 and subjected to verification technique 118. For example, a sub-string 124 of document 102B can be compared to member 110 utilizing filtration technique 116. Even though the sub-string is not an exact match, the similarity can be sufficient to exceed the predetermined threshold to be considered a candidate match 122.

In some instances, filtration technique 116 can distinguish or bifurcate strings or sub-strings that can match a particular entity (i.e., "candidate matches") from those that cannot match (i.e., non-candidates). The verification technique 118 can ensure that candidate matches do in fact match the member (i.e., are true matches 126). Accordingly, an objective of filtration technique 116 can be to prune non-candidates to avoid wasting verification resources on the non-candidates since by definition they cannot match the member(s). An objective of the verification technique can be to determine if a candidate match 122 is a true match 126 or conversely a false match 128.

The present configuration can allow filtration techniques 116 to be utilized which produce some false positives (i.e., candidate matches which upon verification turn-out not to match the member and are thus false matches). The ability to deal with false positives during verification can allow filtration techniques to be employed that may not be satisfactory with existing technologies. Accordingly, among various potential advantages, the present implementations can employ filtration techniques that consume less processing resources than those that can be employed with existing technologies. This point is described in more detail below under the heading "Additional Implementations".

The potential advantages of system 100 can be more pronounced when the reader recognizes that the example of FIG. 1 is simplified for ease of illustration and discussion. Pragmatically, many real life member tables 106 can contain thousands or millions of members. For instance, a digital phonebook can have millions of names (i.e., members) for a single large city or an online shopping site can contain millions of products (i.e., members). Similarly, a document 102A-102C can include many thousands of words. Further, while three documents and a single database 104 are discussed, the processing savings can be even more pronounced when applied to larger numbers of documents and/or databases.

FIG. 2 shows another membership checking system 200. System 200 retains document 102A and database 104 and associated elements described above which are not reintroduced here for sake of brevity. Further, system 200 includes a filtration component 202, a verification component 204, and a summary structure 206. In this case, the summary structure contains a signature list 208 for members 108, 110 and 112 of member table 106.

In the present scenario, a set of sub-strings 220 are generated from string 114A. Various techniques can be utilized to generate the sub-string set 220. Filtration component 202 can generate the sub-string set 220 or obtain the sub-string set from another component.

Here, sub-strings can be generated from each word in string 114A. For instance, sub-string 222 is the word "The" which is the first word in string 114A. Subsequent sub-strings 224, 226 include the first two and three words "The EOS" and "The EOS digital", respectively, of string 114A. The number of words in a sub-string can be limited to a predefined maximum value. Maximum values can commonly be set between 5 and 10, but other values outside this range can also be used. For sake of brevity, several sub-strings subsequent to sub-string 226 are not shown.

Sub-string 230 begins the process again utilizing the second word "EOS" of string 114A. The next sub-string 232 is the second word "EOS" and the next word "Digital" in the string. The next illustrated sub-string 234 is the second word of string 114A, "EOS", followed by the next three words in the string "Digital Rebel XTi". Again, some intervening and subsequent sub-strings are not shown for the sake of brevity.

Filtration component 202 can serve to identify the candidate matches 122 from the sub-string set 220 and can thereby prune the remaining sub-strings. In some instances, filtration component 202 can utilize summary structure 206 to identify the candidate matches 122. Summary structure 206 can include data derived from member table 106.

Stated generally, filtration component 202 can utilize the information contained in the summary structure 206 to identify individual sub-strings of sub-string set 220 that cannot approximately or exactly match an entity of entity table 106. Correspondingly, the remaining sub-strings that can match an entity can be identified as candidate matches or sub-strings 122 by the filtration component 202.

In some configurations, the data of the summary structure 206 can include signatures 208 of entities 108, 110 and 112. Briefly, a signature can be thought of as a relatively important token(s) from a member or sub-string. For instance, some tokens, such as "digital" or "Canon", tend to be used in relation to so many members that they have relatively low identification value. Other tokens, such as "Rebel" and "Xti", are relatively rare and can be relatively highly definitive for signature purposes. The signature or signatures can be generated from the relatively highly definitive words or tokens of a member or sub-string.

An underlying concept of signatures is that for a sub-string of sub-string set 220 to match a member 108, 110 and 112, the sub-string should match at least one token of the corresponding signature. In this case, the signature for member 108 is listed as "Rebel Xti" at 236. Similarly, the signature for member 110 is listed as "ThinkPad X61" at 238 and the signature for member 112 is listed as "Handycam DCR SR42" at 240. In the present scenario, sub-string 234 contains both tokens "rebel" and "Xti" that are indicated as the signature 236 for member 108.

The present configuration can leverage the fact that for a sub-string 222, 224, 226, 230, 232 or 234 to match a member, the sub-string should match the member's signature. Since the signatures contain fewer tokens, a candidate match can be identified with less processing than might be involved in a direct comparison. Utilizing the member signatures, the filtration component can identify the candidate matches 122 from sub-set 220.

Filtration component 202 can send the candidate matches 122 to verification component 204. The verification component further processes the candidate matches 122 to separate "True Matches" 126 from "False Matches" 128. As the name implies "True Matches" 126 can be thought of as the candidate matches that approximately or exactly match a member of member table 106. Correspondingly, the false matches 128 can be thought of as the candidate matches that do not approximately or exactly match a member of member table 106. In this example, candidate member "EOS Digital Rebel XTi" originally indicated at 234, is identified or verified as a true match 126. Various known verification techniques, such as fuzzy matching, can be utilized in system 100 as should be recognized by the skilled artisan. Several examples are described below under the heading of "Additional Implementations".

In many scenarios, the member table 106 is known a priori (i.e., before the document strings are received as a query for membership checking). Accordingly, the summary structure 206 can be prepared in advance of the sub-string set 220 being received by the filtration component 202. In such a configuration, the use of the summary structure 206 can reduce processing requirements of the filtration component 202 upon receipt of the sub-string set 220. For instance, filtration component 202 can utilize unallocated processing resources during periods of low processing demand to generate the summary structure 206 from the member table 106. This can reduce processing requirements when the filtration component 202 actually filters the sub-string set. Further, determining actual or approximate matches against the summary structure can utilize fewer processing resources than a determination made against the member table 106.

System 200 can include a single computing device that includes or accesses document 102A and database 104. In such a configuration, the computing device can include the filtration component 202, verification component 204 and summary structure 206. Alternatively, system 100 can include multiple coupled or networked computing devices. Examples of computing devices can include personal computers, other types of computers, such as Apple brand computers, cell phones, personal digital assistants (PDAs), and other computing devices acting as servers or clients, among others. In the latter configuration, the filtration component 202, verification component 204, and summary structure 206 can occur on a single device or be spread among multiple devices. In some cases, these components can be stored on the computing device(s) as computer-readable storage media. The computer-readable storage media can serve to store instructions that when executed by a processor of the computing device cause the computing device to perform acts associated with the components.

FIG. 3 illustrates another system 300 capable of membership checking in the form of detecting member mentions in a document. System 300 can build upon systems 100 and 200 described above. In this case, the summary structure 206 of FIG. 2 is utilized to generate an inverted signature-based hashtable 302. The inverted signature-based hashtable 302, in combination with the filtration component 202, can be termed an inverted signature-based hashtable filter (hereinafter, "ISH filter") 304.

System 300 also includes an index table 306 which can be accessed by verification component 204. For ease of description, processes of system 300 are categorized as occurring during a build phase 308 and a query phase 310 which will be described below.

During build phase 308, the ISH filter 304 can pre-process or cause pre-processing of member table 106. The pre-processing can be utilized to build inverted signature-based table 302 and/or index table 306.

During query phase 310, the ISH filter 304 can compare individual sub-strings of the sub-string set to the inverted signature-based hash table 302 to distinguish candidate sub-strings or members from non-candidate sub-strings or members. Accordingly, non-candidate sub-strings that do not match with any member in the member table can be quickly pruned. Further, verification component 204 can utilize index table 306 to determine whether candidate matches 122 are true matches 126.

Due to the use of both filtration component 202 and verification component 204, the filtration component 202 can be specifically configured to perform the pruning function. Other functionalities, such as ranking of candidate matches, can be performed by the verification component. Further, the two stage filtration and verification configuration can address false positives at the filtration stage (i.e., system performance is not diminished if the filtration component identifies false candidates since the candidates are later verified). Accordingly, more flexibility is available at the filtration stage when compared to solutions that must avoid false positives.

FIG. 4 shows a more detailed view of one implementation of inverted signature-based hashtable 302 of FIG. 3. In this implementation, the inverted signature-based hashtable is manifested as a two dimensional array 402. The two dimensional array can be constructed with tokens of members 108, 110 and 112. For instance, tokens associated with member 108 are indicated at 404 and tokens associated with member 110 are indicated at 406. (Tokens associated with member 112 are not shown for sake of brevity). Accordingly, each of these tokens defines a horizontal row of the two dimensional array 402.

In this case, a signature generator 410 is utilized to generate signatures from sub-strings 222, 224, 226, 230, 232 and 234 for listing in the inverted signature-based hashtable 302. Various signature generators can be utilized; some examples of which are described below. For sake of brevity, signature generation is illustrated only for sub-string 234 and only a single signature "Rebel Xti" is designated at 412. (In other instances, multiple signatures can be generated from a single sub-string.)

The ISH filter 304 can populate individual tokens of signature 412 into vertical columns of the two-dimensional array as indicated at 414, 416 respectively. So, in this particular configuration of the two-dimensional array 402, each horizontal row corresponds to a token or word from a member 108, 110 and 112, and each vertical column corresponds to a token 414, 416 of sub-string's signature. This configuration produces a set of cells 418. An individual cell is assigned a value of 1 if the token and the signature co-occur in a member; otherwise, the cell is assigned the value of 0.

The ISH filter 304 can compare the sub-string signatures with the member tokens in the two dimensional array 402. A member that matches the sub-string will share a certain number (derived from the similarity threshold) of token-signature pairs with the sub-string, where each token-signature pair corresponds to a cell in the two dimensional array. For instance, consider sub-string 234 "EOS Digital Rebel Xti". The signature generator 410 generates the signature 412 of "Rebel Xti". An entity that matches with sub-string 234 will contain either or both of "rebel" token 414 and "xti" token 416 of the signature. Reviewing cells 418 evidences a sub-set of cells 420 with values of 1 that indicate co-occurrence. Cells 420 occur in the rows occupied by the tokens 404 from member 108. Accordingly, sub-set 234 can be considered as a candidate match for member 108 of member table 106. Any further examination of member table 106 in relation to sub-string 234 can be directed to member 108 and the other members need not be further examined. For any given document and its associated substrings the number of signatures tends to be less than the number of words or tokens, so comparing only those tokens that are signatures can offer significant savings when compared the total number of tokens.

Returning to FIG. 3, the candidate match 122 identified by the ISH filter 304 can be forwarded to the verification component 204. The verification component can determine if the candidate match is a true match 126. As described above in relation to FIG. 4, signatures can be utilized to identify candidate matches. In some implementations, verification component 204 can also use signatures (such as with fuzzy matching) to verify the candidate matches. The concepts introduced here are further explored below under the heading of "Additional Implementations".

Additional Implementations

Approximate Membership Checking

This section provides a formal definition of one implementation of approximate membership checking. This section subsequently presents a unified filtering condition for various similarity measures.

Before proceeding, the reader is reminded that membership checking is different from "text document indexing" and "string similarity join". In text document indexing, documents are preprocessed and queries such as, "find all documents that contain a query string", can be answered. Unlike membership checking, in text document indexing, long documents are given initially and the incoming queries tend to be short phrases (similar to strings in the dictionary). The string similarity join can take two collections of strings as input and identify all pairs of strings, one from each collection, that are similar to each other. Informally, for discussion purposes, one collection of strings can be thought of as a dictionary and the other can be thought of as query strings. A central task of string similarity is to find which string in the dictionary best matches with the query string. In contrast, membership checking identifies sub-strings which approximately match with a dictionary string.

As shown in the above examples, in many cases a member table or dictionary is known a priori and the query strings are submitted on-the-fly. Suppose one implementation is configured to utilize sub-strings with length up to L. All sub-strings with I (I # L) tokens are possible candidates to match with a dictionary string. Since there are a large number of candidate sub-strings to be considered, a membership checking system generally preprocesses the dictionary and builds an efficient summary structure such that candidates that do not match with any string in the dictionary can be quickly pruned.

For purposes of discussion assume that a member table or dictionary R is a set of strings r, each of which is a sequence of tokens $r = (t_1^r, t_2^r, \ldots, t_l^r)$. As used herein the term token refers to the basic element in a string. A typical token is an English word. Alternative token types include characters, q-grams, or their hash values. An input string S (e.g., a document) is a sequence of tokens $S = (t_1^s, t_2^s, \ldots, )$. Any sub-string $m = (t_i^s, t_{i+1}^s, \ldots, t_j^s) \subseteq S$ is a candidate member. m is a true member if there exists a dictionary string r such that similarity $(r,m) \geq \delta$. In accordance with some implementations, the approximate membership checking problem can be formally stated as follows.

Definition 1. Given a dictionary R and a threshold δ extract all true members m ($|m| \leq L$) from input strings S such that there exists r∈ R, and similarity(r;m)≧δ.

Three similarity measures are discussed below: edit similarity, jaccard similarity and weighted jaccard similarity. The skilled artisan should recognize other potential similarity measures consistent with the concepts introduced above and below.

Definition 2. Given two strings r and m, the edit distance ED(r,m) between them is the minimum number of edit operations (i.e., insertion, deletion and substitution) to transform r into m. Some implementations define the edit similarity as $$ES(r, m) = 1 - \frac{ED(r, m)}{\max(|r|, |m|)}.$$

Definition 3. Given two strings r and m, each of which is considered as a set, the jaccard similarity between them is defined as $$JS(r, m) = \left|\frac{r \cap m}{r \cup m}\right|,$$

and a weighted jaccard similarity is defined as $$WJS(r, m) = \frac{wt(r \cap m)}{wt(r \cup m)},$$

where $wt(s) = \Sigma_{t \in s} wt(t)$, and $wt(t) \geq 0$ is the weight[2] of token t.

Example 1

Suppose R={"canon eos 5d digital camera", "canon ef len"}, and S="The Canon eos 5d digital sir camera offers advanced photographers a lightweight, robust digital sir that uses Canon ef len without a conversion factor." $m_1$="Canon eos 5d digital sir camera", and $m_2$="Canon ef len" are two true members with jaccard similarity (δ=0.8).

Utilizing approximate matching allows adaptation of the membership checking problem in a noisy environment. However, it may also lead to redundant results. For instance, by setting δ=0.7,$m_3$="uses Canon ef len" and $m_4$="Canon ef len without" become true but redundant (w.r.t. $m_2$) results. In general, if a true member is extended slightly to the left (or to the right), the resulting sub-string may continue to be a true member, but with a lower similarity score. This is termed "boundary redundancy". Boundary redundancy can be removed when the first and last tokens of m are present in the corresponding dictionary string r.

A Unified Pruning Condition

In one scenario, a filter f avoids comparing m with every dictionary string r∈R. Instead, f computes an upper bound of similarity between the query m and any r∈R. In order to do this, the similarity measures can be carefully rewritten. Instead of developing a filter condition for each similarity function, a unified pruning condition is discussed below. At least one potential advantage is that the technique can now deal with many similarity functions with the same pruning condition.

For "edit similarity", if r and m are within an edit distance of ε, then $|r \cap m| \geq \max(|r|,|m|) - \epsilon$, where r and m are considered as sets of tokens. According to Definition 2, it follows:

$$ES(r, m) \leq 1 - \frac{\max(|r|, |m|) - |r \cap m|}{\max(|r|, |m|)} \leq \frac{|r \cap m|}{|m|}$$

For (weighted) jaccard similarity, the formula $$JS(r, m) \leq \frac{|r \cap m|}{|m|},$$

and $$WJS \leq \frac{wt(r \cap m)}{wt(m)}$$

respectively can be utilized.

Setting wt(t)=1 for edit similarity and unweighted jaccard similarity, a unified pruning condition can be used for all three measures. That is, a candidate m is pruned if:

$$\max_{r \in R} \text{similarity}(r, m) \leq \frac{\max_{r \in R} wt(r \cap M)}{wt(m)} < \delta \quad (1)$$

Since wt(m) can be directly computed from the candidate m, it turns out that a central task of f is to compute the upper bound of $\max_{r \in R} wt(r \cap M)$. This unified pruning condition will be used for the remainder of this discussion, and unweighted measures are considered as weighted ones by assigning uniform weights to all tokens.

Filtering By ISH

Given an input string S, all sub-strings with length up to L are candidate members. This section describes inventive concepts relating to a filtering strategy based on Inverted Signature-based Hashtable (ISH). An example of an ISH filter is evidenced above in relation to FIGS. 3-4. In some configurations, the ISH filter can work as follows. At the offline building phase, the ISH filter is constructed based on the given dictionary. At the online querying phase, the input text string is first submitted to the ISH filter. Only those candidates that pass the filter f(R,δ) will be verified (See Verification Section).

The ISH filter can be motivated by inverted indices. In inverted index, each token t is associated with a list of record id for dictionary strings (rids), whose records contain the token t. Given a query m=(t₁, t₂, ..., t₁), one can merge rids from the inverted indices of $t_{(i=1,...,l)}$, and aggregate weights of token t to a rid that appears in t's inverted index. Since the aggregated weight is exactly the value of wt(r∩m), the pruning condition (i.e., Eqn. (1)) can be tested.

The ISH filter can be thought of as having a structure similar to that of an inverted index. However, the ISH filter instead stores a list of signatures per token obtained by replacing each rid in the rid-list with the set of signatures of the string corresponding to the rid. A potential advantage is that this implementation can quickly determine for a given query sub-string m whether a token's signature list contains any of the signatures generated by m. Depending on the number and weights of tokens which contain m's signatures this implementation can quickly decide whether or not m can match with any string in the dictionary. Observe that these checks do not require this implementation to merge the signature lists. Instead, potentially, the only lookup in each token's signature list is whether m's signatures are present. This is a constant time operation per token. In contrast, inverted index based approaches tend to merge rid-lists which is significantly more expensive and proportional to frequencies of tokens.

Note that the number of signatures per token in the ISH filter is typically greater than the number of rids. However, some implementations can hash the signatures, (at the potential cost of a few more false positives), to a bit array to further compress the signature list. Thus, signature lists can be represented compactly.

The remainder of this section, introduces a new signature scheme (i.e., weighted signature scheme) and then presents the details of the ISH filter. To begin with, Table 1 summarizes the notation.

TABLE 1

Notation and Their Meaning

| Symbol | Meaning |
| --- | --- |
| δ | similarity threshold |
| wt (t) | the weight of a token t |
| m | a query string |
| r | a dictionary string |
| k | a parameter to control the number of prefix signatures |
| λ (m) | number of prefix signatures generated by m |
| Sig (m) | set of signatures generated by m |
| τ (m) | derived threshold for signature merging |

Weighted Signatures

This section provides a general introduction on weighted signatures. Following the introduction is a demonstration based upon the prefix signature scheme.

Previous signature schemes tend to be all binary such that as soon as one signature is shared by a query string and a dictionary string, the query string is considered a candidate for match. In contrast, the present implementations that employ ISH, can simultaneously match multiple signatures by extending the binary signature scheme to the weighted signature scheme. That is, for each pair of query string and dictionary string, these implementations can count the number of matched signatures that occur in both strings' signature sets. Based on the weights associated with each signature, these implementations are now able to derive stronger pruning conditions than those obtained by binary signature schemes. Some implementations can take advantage of the fact that high similarity strings match on multiple signatures such that the "sum of weights" is greater than a threshold.

Given a query string m and a dictionary string r, a binary signature scheme can generate a set of signatures Sig(r) for r and Sig(m) for m. If similarity (r,m)≧δ, then Sig(r)∩Sig(m)≠φ. Ish-signatures can provide one example of a binary signature. In weighted signature schemes, each signature s is associated with a weight wt(s). If similarity (r,m)≧δ, then $wt(Sig(r) \cap Sig(m)) = \sum_{s \in Sig(r) \cap Sig(m)} wt(s) \geq (m,\delta)$, where τ(m, δ) is a threshold determined by the signature scheme, m and δ. As explained below, prefix-signatures can be extended to weighted signatures. When the context is clear, these implementations can use τ(m) to notate τ(m,δ).

Example 1

Given a string r, a prefix signature scheme can sort r in decreasing weight order, and extract the prefix tokens whose aggregated weight is larger than (1−δ)×wt(r). Each prefix token can be a signature. The prefix signatures can be generated for each candidate m in the same way. Prefix signatures can be weighted signatures, and the weight of each signature can be the weight of the corresponding token. The value of τ (m) is defined in the following Lemma.

LEMMA 1. Let the prefix signatures for two strings r and m be Sig(r) and Sig(m). If similarity (r,m)≧δ, then τ (m)=wt (Sig(m))−(1−δ)wt(m).

Example 2

Suppose r="canon eos 5d digital camera", m="Canon eos 5d digital sir camera", and the weights of tokens (digital, camera, canon, eos, 5d, slr) are (1, 1, 2, 2, 7, 9), respectively. Assume δ=0:8, thus WJS(r,m)=0:909≧δ. Let k=3, the prefix signatures[3] for r is Sig(r)={5d, eos, canon}, and that for m is Sig(m)={5d, slr, eos}. That leaves τ (m)=wt(Sig(m))−(1−δ) wt(m)=18−(1−0.8)×22=13.6, and wt(Sig(r)∩Sig(m))=16≧τ (m).

Number of Signatures: Note that for the same threshold, one can choose different numbers of prefix signatures. The minimal number of signatures corresponds to the shortest prefix such that wt(Sig(r))≧(1−δ)×wt(r). In the above example, the minimal number of signatures for r is Sig(r)={5d}. The maximal number of signatures is to include all tokens. Intuitively, generating more signatures requires more signature-matches at query time and thus leads to stronger filtering power (this is in contrast to earlier binary signature-tures). On the other hand, more signatures translate to more space. Some of the present implementations use a parameter k to control the number of signatures. For instance, where λ(r,k) is the number of prefix signatures generated r, then:

$$\lambda(r, k) \begin{cases} \lambda\min(r) & \text{if } \lambda\min(r) > k \\ \lambda\max(r) & \text{if } \lambda\max(r) < k \\ k & \text{otherwise} \end{cases}$$

where λmin(r) and λmax(r) are the minimal and maximal number of prefix signatures from r. The discussion further explores the issue of configuring k under the heading "Adapting to Memory Budget". For simplicity, the following discussion uses λ(m) to notate λ(m; k) when the context is clear.

Inverted Signature Based Hashtable

A more detailed discussion of ISH filter implementations follows below. While ISH can handle any signature schemes, the described implementations are introduced utilizing the prefix signature technique. Extensions to other signature schemes are discussed subsequently. The discussion centers on the filter structure, building phase and the querying phase.

Filter Structure: In ISH, each token can be associated with a signature list, which is further compressed by a hash table. The hash table can be implemented as a bit-array and each signature can correspond to a position in the bit-array (e.g., a corresponding position is set to 1 if the signature presents; otherwise, it is 0). For each dictionary string, these implementations compute the signature set and associate each signature with each individual token in the string. In this case a single signature list is utilized for each distinct token. In this instance, the ISH filter can be created by unioning all signatures for each token across all dictionary strings.

Building Phase: Let BA(t) be the bit-array corresponding to token t (details on how to assign spaces for bit-arrays are discussed below under the heading "Complete Filter"), and let signatures of a string r be Sig(r)={$s_1$; $s_2$, . . . , $s_{\lambda(r)}$}.

Figure 5:
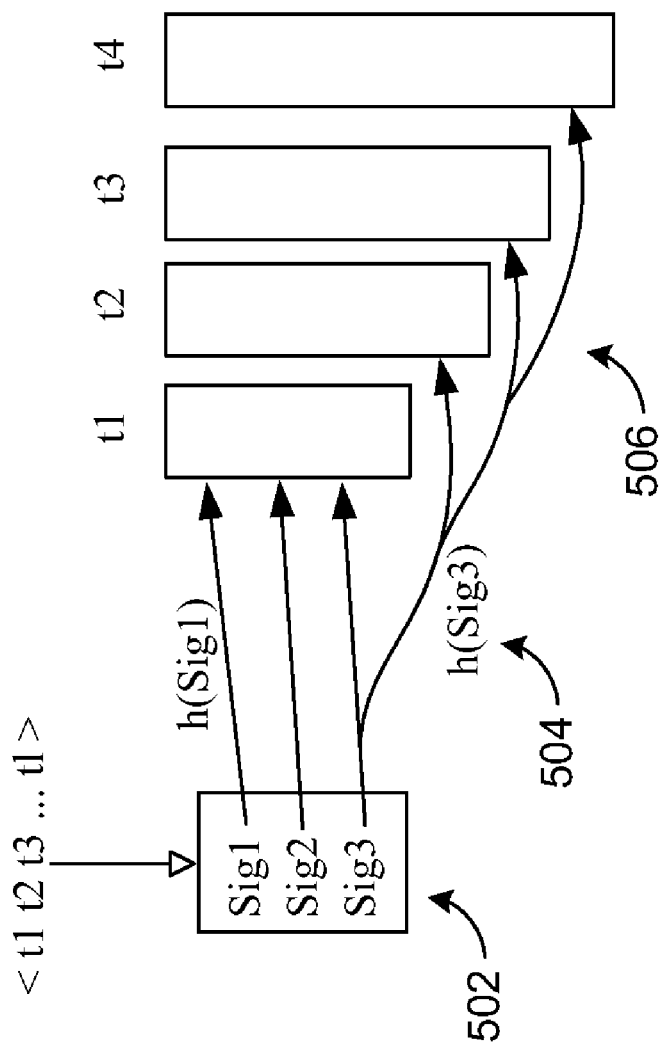
FIG. 5 shows an exemplary technique relating to membership checking in accordance with some implementations of the present concepts.

FIG. 5 shows one example of how the ISH filter can be built. In this case:
1. For each string r=⟨$t_1$, $t_2$, . . . , $t_l$⟩∈R, compute λ(r) signatures for r: Sig(r)={$s_1$, $s_2$, . . . , $s_{\lambda(r)}$} as designated generally at 502.
2. Compute the hash value h($s_i$) for all signatures $s_i$ (i=1 . . . , λ(r)) as designated generally at 504;
3. For each token $t_i$∈{$t_1$, $t_2$, . . . , $t_l$}, and for each hashed signature h($s_i$) (i=1 . . . , λ(r)), find a position $p_{ij}$ on BA($t_j$) according to h($s_i$) as designated generally at 506. Set the bit at position $p_{ij}$ on BA($t_j$) to 1 (all bits on BA($t_j$) are 0 initially).

Example 3

Suppose prefix signatures are used and k is set to 3. Let R={$r_1$="canon eos 5d digital camera", $r_2$="nikon digital slr camera", and the weights of tokens (digital, camera, canon, nikon, slr, eos, 5d) be (1, 1, 2, 2, 2, 7, 9), respectively. Sig($r_1$)={5d, eos, canon}, Sig($r_2$)={slr,nikon,camera}. The signature list for each token is shown in Table 2. Note the table is only shown for demonstrating the concept; it may not be materialized in implementation. The signatures and their hash values are shown in Table 3. For simplicity, these implementations rely upon the assumption that all tokens are assigned the same bit-array size. After hashing signature lists, the bit-arrays of tokens are shown in Table 4 (assuming the bit-array index position starts from 0), which is the ISH-filter for R.

TABLE 2

Signature Lists

| Token | Signature List |
|---|---|
| Canon | 5d, eos, canon |
| eos | 5d, eos canon |
| 5d | 5d, eos, canon |
| digital | 5d, eos, canon, slr, nikon, camera |
| camera | 5d, eos, canon, slr, nikon, camera |
| nikon | slr, nikon, camer |
| Slr | slr, nikon, camer |

TABLE 3

Signatures and Hash Values

| Signature | Hash |
|---|---|
| 5d | 3 |
| eos | 5 |
| canon | 0 |
| slr | 4 |
| nikon | 3 |
| camera | 4 |

TABLE 4

Tokens and Bitarrays

| Token | Bit Array |
|---|---|
| canon | 100101 |
| eos | 100101 |
| 5d | 100101 |
| digital | 100111 |
| camera | 100111 |
| nikon | 000110 |
| slr | 000110 |

Querying Phase: To test a candidate m=,⟨$t_1$, $t_2$, . . . , $t_l$⟩, this implementation generates λ(m) signatures for m, and applies the same hash function on signatures $s_i$ (i=1, . . . , λ(m)) to get $\lambda(m) \times 1$ array positions: $p_{ij}$ corresponds to the position of $s_i$ on bit-array $BA(t_j)$ (j=1, . . . , 1). Let P be a $\lambda(m) \times I$ bit-matrix where row i (i=1, . . . , $\lambda(m)$) corresponds to $s_i$, and column j (j=1, . . . , I) corresponds to $t_j$. Cell P[i,j]=1 if the bit array $BA(t_j)$ is set to 1 at position $p_{ij}$, otherwise, P[i,j]=0. The bit-matrix can be seen as a small working-set corresponding to the current query. The number of columns in the bit-matrix is the number of tokens in the query. The number of rows in the bit-matrix is the number of signatures generated from the query string.

TABLE 5

| Bit-matrix $P(Sig(m_1); m_1)$ | | | | | |
|---|---|---|---|---|---|
| | canon | eos | 5d | digital | Slr | camera |
| $s_1$ = 5d | 1 | 1 | 1 | 1 | 1 | 1 |
| $s_2$ = eos | 1 | 1 | 1 | 1 | 0 | 1 |
| $s_3$ = slr | 0 | 0 | 0 | 1 | 1 | 1 |

Example 4

Given the dictionary R and the ISH filter built in Example 3, Table 5 (the matrix $P(Sig(m_1); m_1)$) and Table 6 (the matrix $P(Sig(m_2); m_2)$) correspond to the query strings $m_1$={"canon eos 5d digital sir camera"}, and $m_2$={"canon sir digital camera"}, respectively. Suppose $\delta$=0:8. Using the same prefix signatures, $Sig(m_1)$={5d,eos,slr} and $Sig(m_2)$={slr,canon, camera}. In Table 5, the bit on column canon and row 5d is 1 because the bit corresponding to hash(5d) on the bit-array of canon is 1 (in Table 4).

TABLE 6

| Bit-matrix $P(Sig(m_2); m_2)$ | | | |
|---|---|---|---|
| | canon | digital | slr | camera |
| $s_1$ = slr | 0 | 1 | 1 | 1 |
| $s_2$ = canon | 1 | 1 | 0 | 1 |
| $s_3$ = camera | 0 | 1 | 1 | 1 |

In this case, each row in the matrix P corresponds to a set of signatures, (the mapping tends to be one-to-many due to the hash collision), and each signature maps to a set of dictionary strings where the signature is generated. Hence, every row in the matrix P represents a subset of dictionary strings that can possibly match with the query string. Suppose the subset of dictionary strings corresponding to the $i^{th}$ row is $R_i$. Cells with value 1 indicate that the corresponding token is shared by the query string and one of the dictionary strings in $R_i$. Let $m^I = m \cap r$ (i.e., $m^I$ is the set of tokens whose corresponding bits are set to 1). The aggregated weight $wt(m^I)$ is a upper bound of $wt(m \cdot r)$ for all $r \in R_i$. Thus, a necessary condition for m to match with any $r \in R_i$ is $wt(m^I) \geq \delta \times wt(m)$.

In some implementations, the weighted signature scheme can require multiple signatures to be matched simultaneously. That is, instead of looking for each individual row in the matrix P, these implementations can examine multiple rows at the same time. Let $Sig^I \subset Sig(m)$ and $m^I \subset m.P(Sig^I; m^I)$ be a sub-matrix of P by selecting rows in $Sig^I$ and columns in $m^I$. In this case, $P(Sig^I; m^I)$ is solid if all cells P[i; j] 0 P(sig$^I$; m$^I$) are set to 1. Using $P(Sig^I; m^I)$, these techniques can derive a necessary condition for m if m matches with a string r in the dictionary, as stated in Theorem 1.

THEOREM 1. Suppose an ISH filter has been built based on the dictionary R and the similarity threshold is $\delta$. For any candidate m, if there exists $r \in R$ and similarity(r,m) $\geq \delta$, then there must exist a solid sub-matrix p(Sig$^I$; m$^I$), such that:
1. $wt(m^I) \geq \delta \times wt(m)$;
2. $wt(Sig^I) \geq \delta(m)$.
where $m^I \subset m$ and $Sig^I \subset Sig(m)$.

Example 5

Continuing with Example 4, the present techniques can look for solid sub-matrices. From matrix $P(Sig(m_1); m_1))$, we find $Sig^I$={5d,eos}, and $m^I$={canon, eos, 5d, digital, camera} such that $P(Sig^I; m^I)$ is a solid sub-matrix, $wt(Sig^I)$=16$\geq\delta$ (m)=13.6, and $wt(m^I)$=20$\geq\delta\times wt(m)$=16. Hence, $m_1$ is accepted as a candidate member. On the other hand, $m_2$ is pruned because a sub-matrix that satisfies Theorem 1 does not exist.

Adapting to a Memory Budget

Here the discussion is directed to how to determine the value of k, which determines the number of signatures (further described in the "Weighted Signatures" section) and thus determines the memory usage. These techniques can first consider the case where the given memory budget M is sufficient to store the filter and then consider the case where M is not large enough to hold the complete filter.

Complete Filter

This implementation presents a simplified analysis, which works well in selecting k in the described experiment. Given the memory budget M, the computational factor utilized in this implementation can achieve the best filtering power (e.g., least rate of false positives). As shown in Section 4, given a value of k, the space requirement of the ISH Filter is $N(k) = \Sigma_{t \in T} n(t,k)$, where T is the set of distinct tokens in R, and n(t;k) is the total number of signatures generated by all $r \in R$ such that $t \in r$. The value of n(t;k) for each token t and a determined k can be computed by scanning the dictionary once. In this case, the size of the bit-array BA(t) is set to be $$\frac{M \times n(t, k)}{\sum_{t \in T} n(t, k)}.$$

For each signature, this implementation assumes that a hash function selects each position on a bit-array with equal probability. For each k value, let $\gamma(t;k)$ represent the expected proportion of bits in BA(t k) still set to 0 after all $r \in R$ have been inserted.

$$\gamma(t, k) = \left(1 - \frac{N(k)}{M \times n(t, k)}\right)^{n(t,k)} \approx 1 - \frac{N(k)}{M}$$

The rightmost term does not contain t, and this discussion notates $$\gamma(k) = 1 - \frac{N(k)}{M}$$

thereafter.

Given a candidate $m = \langle t_1, t_2, \ldots, t_l \rangle$, let the set of signatures be $Sig(m)$={$s_1, s_2, \ldots, s_\lambda$}, and P be the $1 \times \lambda(m)$ bit matrix where row i (i=1, . . . , $\lambda(m)$) corresponds to $s_i$, and column j (j=1, . . . , l) corresponds to $t_j$. There are two cases that lead to cell P[i; j]=1: signature collision and hash collision. The former can happen if there exists an r where $t_j \in r$ and $s_i \in Sig(r)$, and the latter can happen if a corresponding bit on BA(t) was set to 1 by other signatures. In this problem configuration, control of the memory (e.g., M is 2-3 times larger than N(k)) may be required. Hence, the probability of hash collision is around $$\frac{1}{3} \text{ to } \frac{1}{2}.$$

On the other hand, the probability of signature collision is usually much smaller [8, 3]. Thus, this implementation considers the hash collision only, and the probability that P[i;j]=1 is $1-\gamma(k)$.

The weights of tokens and signatures of m may be chosen arbitrarily. This implementation uses expected weights for tokens and signatures, which simplify this problem to the unweighted case. Consequently, the pruning conditions in Theorem 1 can be rewritten as follows. A candidate $m=\langle t_1, t_2, \ldots, t_l \rangle$ that does not approximately match with any r∈R will be falsely accepted if there exists a solid sub-matrix $P(Sig^I; m^I)$, such that $|m^I| \geq \delta |m|$ and $|Sig^I| \geq \tau(m,\delta)$. Typically, for unweighted prefix signature $\tau(m,\delta)=|Sig(m)|-(1-\delta)|m|$.

For any signature $s_i \in Sig$, the discussion uses the notation hit($s_i$)=true if there are at least $\pm £jmj$ 1s on the ith of row P. For a given k, the probability of Prob(hit(s)=true) is:

$$\beta(|m|, k) = \sum_{h=\delta|m|}^{|m|} \binom{|m|}{h} (1-\gamma(k))^h \gamma(k)^{|m|-h}$$

To compute the probability of the presence of a solid sub-matrix with multiple signatures is rather complicated. Let $\eta(k)$ be the probability of there existing a solid sub-matrix $P(sig^I; m^I)$, such that $|m^I| \geq \delta |m|$ and $|Sig^I| \geq \tau(m,\delta)$. This implementation utilizes:

$$k = \text{argmin}_i(\eta(i))$$

Partial Filter

Here some implementations can provide solutions when M is not sufficient to hold the complete filter. One solution is to remove bit-arrays belonging to high frequency tokens. That is, some implementations sort tokens in the decreasing order of n(t; k), and progressively remove BA(t) until the remaining bit-arrays fit in M. Intuitively, high frequency tokens are similar to stop words. They appear in many strings in the dictionary, and are associated to a large number of signatures. Thus, the probability of signature collision for high frequency tokens is relatively larger (the expected hash collision is same for all tokens). On the other hand, the high frequency tokens can consume significant amount of memory space. In many applications, the frequency distribution of tokens follows the power-law distribution. In this discussion it is expected that by removing a small number of tokens the memory requirement of the ISH filter is quickly reduced. To avoid false negatives, for each t that BA(t) is removed, any query against BA(t) returns 1 (e.g., assuming BA(t) is full of 1). Hence, the reduced memory configuration may introduce additional false positives.

Other Signature Schemes

As stated earlier, the ISH filter is a framework which supports multiple signature schemes. The above discussion demonstrated the filter by prefix signatures. Here, the discussion relates to how to incorporate other signature schemes in the framework. Some implementations use locality-sensitive hashing (i.e., Ish). The extension to other signature schemes (e.g., partenum) can be addressed similarly.

A potentially key idea in Ish is to hash a sequence of tokens so as to ensure that for each hash function, the probability of collision is much higher for similar sequences than for dissimilar sequences. The process is probabilistic and can introduce both false positives and false negatives. In order to reduce the false negatives, I different signatures are computed. The classic implementation of Ish is minhash-based that concatenates g minhashes as a signature. To achieve false negative rate $\omega$, I can be chosen as the minimal integer that satisfies $(1-\delta^g)^I \leq 1-\omega$, where $\delta$ is the similarity threshold.

Note that Ish is a binary signature scheme. By setting wt(s)=1 for each Ish signature, and $\tau(w)=1$ for the hit signature threshold, these techniques can directly replace prefix signatures by Ish signatures in the building and querying phases.

Verification

The following discussion relates to verification. One option is to use the batch verification that takes the complete set of candidate members and the dictionary input, and output $\langle m,r \rangle$ pairs where similarity(r,m) $\geq \delta$. This scenario can be thought of basically as a string similarity join problem.

Besides batch verification, some implementations support one-at-a-time verification. Similar to approaches in string similarity join, these implementations index dictionary strings by their signatures. A naive method could issue a call for all signatures in the candidate, and each signature call returns all dictionary strings that contain the signature. The present implementations can reduce the number of signature calls, as well as the number of dictionary strings retrieved. The intuition is that the ISH filter has more detailed information on which signatures need to be called, and which dictionary strings need to be retrieved. Similar to the filtering module, the verification module also consists of two phases: the build phase and the query phase.

Building Phase: In the building phase, some implementations create $\lambda(r)$ tuples $\langle id,r,hash\_sig,wt \rangle$ for each dictionary string r and each signature generated by r. Where hash_sig is the hash code of the signature, and wt is the weight of the string r. These implementations can store all tuples in a relational table V, and create a clustered index on $\langle hash\_sig, wt \rangle$.

Querying Phase: In the querying phase, some implementations can identify all matched signatures and compute the upper and lower bounds of wt(r) to retrieve dictionary strings. It can be beneficial to compute these bounds from all solid sub-matrices that satisfy Theorem 1. Such configurations can enumerate all submatrices. An alternative solution is as follows.

For any candidate m that was accepted by the filter, let $\tilde{m}$ and $\tilde{Sig}$ be the sets of conditional hit tokens and conditional hit signatures as defined below.

Definition 4. Given a candidate m, a token t∈m is a conditional (on m) hit token if there exists a set of signatures $\{s_1, \ldots s_i\} \subseteq Sig(m)$ such that the cells (in bitmatrix P) corresponding to t and $s_1, \ldots s_i$ are set to 1 and $wt(s_1) + \ldots + wt(s_i) \geq \tau(m,\delta)$. A signature s∈Sig(m) is a conditional (on m) hit signatures if there exists a set of tokens $\{t_1, \ldots t_j\} \subseteq m$, such that the cells corresponding to s and $t_1, \ldots t_j$ are set to 1 and $wt(t1) + \ldots + wt(tj) \geq \delta \times wt(m)$.

Clearly, for any solid sub-matrix $P(Sig^I; m^I)$ that satisfies Theorem 1, $Sig^I \subseteq \tilde{Sig}$ and $m^I \subseteq \tilde{m}$. Thus, for each s∈$\tilde{Sig}$, These techniques retrieve the dictionary strings by:

Select * from V where
hash_sig=hash(s) and $$\delta \times wt(m) \le wt \le \frac{wt(\tilde{m})}{\delta} m$$

is verified against the retrieved dictionary strings.

Exemplary Algorithm

This section presents one version of a complete algorithm for approximate membership checking. Given an input string S, the algorithm tests all sub-strings with length up to L using the filter, and those candidate members are further submitted for verification. A high level description of the framework is illustrated in Algorithm 1.

---
Algorithm 1 Approximate Membership Checking
---

Input: R, $\delta$, S = $<t_1,t_2,...,>$
1: Build the filter f(R,S);// offline
2: Index R for verification; // offline
3: for (start = to |S|−L+1)
4:  for (length = 1 to L)
5:   m ← $<t_{start},t_{start+1},t_{start+length+1}>$;
6:   if (f.prune(m) == true) continue // filter
7:   if ($\exists r \in$ R,s.t.similarity(r,m) $\ge$ delta) // verify
8:    Output m;

The following discussion explains the algorithm line by line. Lines 1-2 construct the filter and index dictionary strings in the dictionary R. This procedure can be conducted offline. The compact filter can reside in memory, and this implementation operates on the assumption that the dictionary is stored on disk. Lines 3-5 generate query strings with length up to L. The filter f is applied on lines 6. Finally, candidate members which passed f are verified in line 7. Note that Algorithm 1 verifies each candidate member one-at-a-time. Alternatively, one can keep all candidate members in a candidate set, and then issue a batch verification at the end of the execution.

Preliminary Filtering Techniques

Two basic filtering techniques are discussed below. These methods may not achieve the desired filtering power of any approach used in the experiments, but they have very low computational overhead and can optionally be integrated with any advanced filters.

Filtering by Token-Table

The first method maintains a token hash table of all distinct tokens appearing in R (notated as TT(R)). In general, even for very large R, the number of distinct tokens may still be much smaller. This discussion assumes TT(R) can fit in memory.

Hit Tokens: For each token t in the candidate m, this discussion calls t a hit token if t∈m∩TT(R). Clearly, m can be safely pruned if $$\sum_{t \in TT(R) \cap m} wt(t) < \delta \times wt(m).$$

Strong Tokens: Given a string r∈R, all tokens t∈r can be sorted in decreasing order of their weights, and then divided into two parts: strong and weak. The strong set consists of the shortest prefix of tokens whose aggregated weight is larger than (1−$\delta$)×wt(m). Intuitively, for any candidate m, if there exists a string r such that similarity(r,m)$\ge\delta$, then there is at least one token t from the strong set of r, and t∈r∩m. Based on this observation, for each token t∈TT(R), these techniques maintain a boolean value strong (t) such that strong (t)=true if and only if t belongs to the strong set in at least one r∈R. Consequently, a candidate m can be pruned if no token in m is strong.

Handling Short Candidates

The second method applies an exact-match module to match short candidates m against a set of pre-computed variations of all r∈R. Let $I_E$ be the maximal candidate length for exact-match (e.g., $I_E$=3). The discussion relates to how to handle candidate whose length is no larger than $I_E$ E for unweighted and weighted measures separately.

Unweighted Measures: Intuitively, for a short candidate m, even the smallest difference (i.e., by differing one token) from a string r may lead to similarity (r,m)<$\delta$. More specifically, let $$l(\delta) = \frac{\delta}{1-\delta}.$$

For any m≠r, and |m|<l($\delta$), similarity is $$(r, m) \le \frac{|m|}{|r|} \le \frac{l(\delta)}{l(\delta)+1} = \delta.$$

Let $I_E$<l($\delta$), then for any candidates m(|m|$\le I_E$), m is a true member if and only if there exists r∈R, such that r=m. This is an exact match problem. This discussion can apply exact-match based membership checking methods to store all strings r(|r|$\le l_E$) and extract true members whose length is no longer than $I_E$ efficiently.

Weighted Measures: Unlike the unweighted measures, weighted similarity (i.e., WJS measure) cannot be bounded by the length of candidates due to different token weights, and thus all strings in R should be considered for approximately matching with m (|m|$\le l_E$). For each string r∈R, the discussion enumerates all $r^J \subset r$ such that wt($r^J$)$\ge$×wt(r), and |$r^J$|$\ge l_E$. The implementations then store pairs in the exact matching structure.

For a candidate m(|m|$\le l_E$), the matching scenario can be divided into two categories:

1. There exists an $r^J$ such that $r^J$=m. Since $$\frac{wt(r^J)}{wt(r)} \ge \delta,$$

m is a true member.

2. There exists an $r^J$ and a $m^J \subset m$ such that $r^J=m^J$. m is true member if $$\frac{wt(r^J)}{wt(r) + wt(m) - wt(r^J)} \ge \delta$$

The discussion above in relation to membership checking briefly discusses how to remove boundary redundancy for all three methods. First, all methods can use the token table to identify hit tokens. A candidate is directly pruned if either the first token or the last token is not a hit token. Secondly, for Segmented-Merging, these implementations only consider strings that contain both the first and the last tokens (e.g., rids appearing in the both lists of the first and last tokens). Finally, for ISH-Filter, these implementations are conditional on whether both first and last tokens are conditional hit tokens (Definition 4).

Discussion

Here the discussion involves two extensions of the proposed methods: (1) leveraging progressive computation for efficient filtering; (2) integrating different tokenization schemes.

Progressive Computation: In the membership checking problem, every possible sub-string from the input string is a candidate. In general, the technique first fixes a start position of query sub-strings, and then progressively expands the query sub-string by including more tokens, until the potentially maximal length is reached. Progressive computation refers to the possible computation share among neighboring query sub-strings. Progressive computation has been a main focus of previous proposals in exact-match (or small error) based sub-string lookup. Those methods build an in-memory structure that directly outputs the true members. Since no verification is involved, applying progressive computation can significantly improve the algorithm efficiency. To support flexible similarity thresholds in the present problem, the techniques use a filter verification framework, where the verification cost becomes the main component in the overall computational cost. Therefore, the discussion did not explore the progressive computation with the ISH-Filter.

For some applications where verification is not required, or cheap verification methods are available, the techniques can apply progressive computation for ISH-Filter as follows. First, the prefix-signature generation can be made progressive. In fact, it is very likely that the prefix-signatures (or majority of them) remain the same when more tokens are included in the query sub-string. Second, the bit-array lookup for each signature can be made progressive. Suppose the current candidate length is |m|, and the number of signatures is |Sig|. Without progressive computation, it may involve |m|×|Sig| bit-lookups. Assume the lookup results of the previous candidate (with length |m−1|) are retained. When the techniques move |m|−1 to |m|, it will generate at most one new prefix-signature. Hence, the number of incremental bit-lookups is at most |m|+|Sig|(|m| bit-lookups for the new signature, and |Sig| bit-lookups for the new token).

Tokenization Scheme: The techniques use individual English words as tokens to demonstrate the methods. In fact, the tokenization module is orthogonal to the inverted signature-based hash table structure. For instance, the techniques can use a q-gram that combines q English words as a token, and builds a bit-array for each q-gram. In order to find bit-array entries, the algorithm may need to maintain a q-gram table, which could be significantly larger than the table for distinct words. To remedy this, one can hash q-grams to a smaller range and only keep entries for the hash codes. This is equivalent to randomly group multiple q-grams. Another method is to simply create a big bit-array with size M (e.g., the complete memory budget), and insert (q—gram, signature) pairs to the bit-array.

Exemplary Methods

FIG. 6 illustrates a flowchart of a method or technique 600 that is consistent with at least some implementations of the present membership checking concepts. The order in which the technique 600 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

At block 602, candidate matches between document sub-strings and database members are identified utilizing signatures. In accordance with some implementations, a database member that matches a sub-string will share a certain number (derived from the similarity threshold) of token-signature pairs with the sub-string, where each token-signature pair corresponds to a cell in a two dimensional array. In some implementations, signatures from both the document sub-strings and the database members are utilized in identifying candidate matches. In other implementations, signatures are utilized from one or the other of the document sub-strings and database members.

One technique for accomplishing block 602 is described in relation to blocks 604 and 606. Block 604 generates a summary structure relating to signatures of document sub-strings and database members. For instance, in one implementation, signatures of document sub-strings are obtained. The tokens of these signatures are then compared to tokens of the database members. In one instance described above such comparison is achieved via a two dimensional array. An example of such an array is described in relation to FIG. 4.

Block 606 identifies instances where at least a certain number of token-signature pairs co-occur in an individual document sub-string and in an individual database member. One technique for identifying such co-occurring tokens utilizes the two-dimensional array mentioned above. The co-occurrence can be utilized to identify candidate matches.

Independent of block 604 and 606, at block 608 the technique verifies that the candidate matches identified at block 602 are true matches. For instance, in some implementations candidate matches may be identified that are shown during verification to be false positives or false matches. Various techniques can be employed to accomplish the verification. Some verification techniques can utilize fuzzy logic to accomplish the verification. In some of these scenarios the fuzzy logic analyzes the signatures introduced at block 602.

As mentioned above, block 608 verifies that the candidate matches are true matches. Further, in some configurations, the verification function can also encompass additional functionalities. For instance, the verification process may serve to rank the true candidates. In some scenarios, allowing block 602 to focus solely on candidate identification can allow greater architectural flexibility and/or processing savings, among other potential benefits.

CONCLUSIONS

The above discussion generally relates to detecting member mentions in text. One problem addressed by the present techniques is identifying all sub-strings in an (long) input string which approximately match (according to one of several popular similarity measures) with some member string in a large dictionary. The characteristic of this scenario is that most input sub-strings do not match with any member of the dictionary. The present techniques provide a compact filter which efficiently filters out a large number of sub-strings which cannot match with any dictionary member. The sub-strings which pass the present filter are then verified by checking for membership. At the same time, the present filter is exact in that any input sub-string which matches with a dictionary member will not be filtered out. The discussion demonstrates that the present techniques significantly outperform both current best exact methods (often, by an order of magnitude) as well as probabilistic methods, which may not identify a small percentage of matching sub-strings.

Although techniques, methods, devices, systems, etc., pertaining to membership checking are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a data structure populated with document tokens selected from signatures of documents and member tokens selected from database members, the data structure including entries identifying co-occurrences of the document tokens and the member tokens;
a filter component configured to identify individual documents that cannot match individual database members using the co-occurrences identified in the data structure;
a verification component configured to receive a remainder of the documents and to verify whether sub-strings of the remainder of the documents match the individual database members; and
at least one computing device configured to execute one or more of the filter component or the verification component.

2. The system of claim 1, wherein the data structure comprises a summary structure constructed from the database members during a build phase.

3. The system of claim 1, wherein the data structure comprises a summary structure pre-populated with token-signature pairs of the database members and wherein relatively less definitive member tokens are eliminated to decrease an overall size of the summary structure.

4. The system of claim 3, wherein the relatively less definitive member tokens are high frequency member tokens.

5. The system of claim 3, wherein the filter component is configured to ascertain a local memory allocation for the summary structure and to eliminate sufficient numbers of the relatively less definitive member tokens such that the summary structure can be stored in the local memory allocation.

6. The system of claim 1, wherein the data structure comprises an inverted signature-based hashtable.

7. The system of claim 1, wherein the filter component employs a similarity function to prune individual sub-strings that have similarity values with the individual database members below a predetermined threshold.

8. The system of claim 1, wherein the verification component employs fuzzy matching to verify the sub-strings.

9. A method comprising:
populating a data structure with document tokens selected from signatures of documents and member tokens selected from database members, the data structure including entries identifying co-occurrences of the document tokens and the member tokens;
identifying individual documents that cannot match individual database members using the co-occurrences identified in the data structure;
receiving a remainder of the documents; and
verifying whether sub-strings of the remainder of the documents match the individual database members.

10. The method of claim 9, wherein the data structure comprises a summary structure, the method further comprising pre-populating the summary structure with token-signature pairs of the database members and wherein relatively less definitive member tokens are eliminated to decrease an overall size of the summary structure.

11. The method of claim 10, wherein the relatively less definitive member tokens are high frequency member tokens.

12. The method of claim 10, further comprising ascertaining a local memory allocation for the summary structure and eliminating sufficient numbers of the relatively less definitive member tokens such that the summary structure can be stored in the local memory allocation.

13. The method of claim 9, wherein the data structure comprises an inverted signature-based hashtable.

14. The method of claim 9, wherein the identifying comprises employing a similarity function to prune individual sub-strings that have similarity values with the individual database members below a predetermined threshold.

15. A computer-readable storage media having instructions stored thereon that when executed by a computing device cause the computing device to perform acts, comprising:
populating a data structure with document tokens selected from signatures of documents and member tokens selected from database members, the data structure including entries identifying co-occurrences of the document tokens and the member tokens;
identifying individual documents that cannot match individual database members using the co-occurrences identified in the data structure;
receiving a remainder of the documents; and
verifying whether sub-strings of the remainder of the documents match the individual database members.

16. The computer-readable storage media of claim 15, wherein the data structure comprises a summary structure, the acts further comprising pre-populating the summary structure with token-signature pairs of the database members and wherein relatively less definitive member tokens are eliminated to decrease an overall size of the summary structure.

17. The computer-readable storage media of claim 16, wherein the relatively less definitive member tokens are high frequency member tokens.

18. The computer-readable storage media of claim 16, the acts further comprising ascertaining a local memory allocation for the summary structure and eliminating sufficient numbers of the relatively less definitive member tokens such that the summary structure can be stored in the local memory allocation.

19. The computer-readable storage media of claim 15, wherein the data structure comprises an inverted signature-based hashtable.

20. The computer-readable storage media of claim 15, wherein the identifying comprises employing a similarity function to prune individual sub-strings that have similarity values with the individual database members below a predetermined threshold.

* * * * *